United States Patent
Kim et al.

(10) Patent No.: US 10,313,942 B2
(45) Date of Patent: Jun. 4, 2019

(54) METHOD FOR DETERMINING WHETHER TO OFFLOAD TRAFFIC TO WLAN

(71) Applicant: LG ELECTRONICS INC., Seoul (KR)

(72) Inventors: Hyunsook Kim, Seoul (KR); Laeyoung Kim, Seoul (KR); Jinsook Ryu, Seoul (KR); Jaehyun Kim, Seoul (KR); Taehun Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 15/533,447

(22) PCT Filed: Aug. 10, 2015

(86) PCT No.: PCT/KR2015/008360
§ 371 (c)(1),
(2) Date: Jun. 6, 2017

(87) PCT Pub. No.: WO2016/114465
PCT Pub. Date: Jul. 21, 2016

(65) Prior Publication Data
US 2017/0339614 A1  Nov. 23, 2017

Related U.S. Application Data

(60) Provisional application No. 62/103,082, filed on Jan. 14, 2015, provisional application No. 62/104,085, (Continued)

(51) Int. Cl.
*H04W 36/14* (2009.01)
*H04W 8/20* (2009.01)
(Continued)

(52) U.S. Cl.
CPC ............. *H04W 36/14* (2013.01); *H04L 12/66* (2013.01); *H04W 8/20* (2013.01); *H04W 28/02* (2013.01);
(Continued)

(58) Field of Classification Search
None
See application file for complete search history.

(56) References Cited

U.S. PATENT DOCUMENTS 9,717,019 B2 * 7/2017 Duan .................... H04W 28/10
2014/0064068 A1 3/2014 Horn et al.
(Continued)

FOREIGN PATENT DOCUMENTS

| WO | WO 2013/192108 A2 | 12/2013 |
| WO | WO 2014/018820 A1 | 1/2014 |
| WO | WO 2014/165832 A1 | 10/2014 |

OTHER PUBLICATIONS

3GPP, "3rd Generation Partnership Project; Technical Specification Group Services and System Aspects; IP Flow Mobility and Seamless Wireless Local Area Network (WLAN) Offload; Stage 2 (Release 12)," TS 23.261, V12.0.0, Sep. 2014, pp. 1-22.
(Continued)

*Primary Examiner* — James P Duffy
(74) *Attorney, Agent, or Firm* — Birch, Stewart, Kolasch & Birch, LLP

(57) ABSTRACT

One disclosure of the present specification provides a method by which a network entity, which controls a control plane, determines whether to offload traffic of a user equipment (UE) to a wireless local area network (WLAN). The method can comprise a step of acquiring subscriber information on the UE from a subscriber information server, wherein the subscriber information can include a WLAN offloadability indication for a specific packet data network (Continued)

(PDN) connection. The method can comprise the steps of: determining WLAN offloadability for the specific PDN connection on the basis of the WLAN offloadability indication and configuration information; transmitting the WLAN offloadability indication to network nodes according to the determination; and transmitting the WLAN offloadability indication to the UE according to the determination.

8 Claims, 15 Drawing Sheets

Related U.S. Application Data filed on Jan. 16, 2015, provisional application No. 62/105,214, filed on Jan. 20, 2015.

(51) Int. Cl.
*H04W 28/02* (2009.01)
*H04L 12/66* (2006.01)
*H04W 84/12* (2009.01)
*H04W 88/02* (2009.01)
*H04W 88/16* (2009.01)

(52) U.S. Cl.
CPC ............ *H04W 84/12* (2013.01); *H04W 88/02* (2013.01); *H04W 88/16* (2013.01)

(56) References Cited

U.S. PATENT DOCUMENTS

| 2014/0206353 | A1 | 7/2014 | Kim et al. |
| 2014/0211626 | A1 | 7/2014 | Liu |
| 2014/0321328 | A1* | 10/2014 | Zuniga ................ H04W 8/06 370/254 |

OTHER PUBLICATIONS

Ericsson, "Co-Existence Between NBIFOM and Rel-12 "RAN Rules" Solution," SA WG2 Meeting #106, S2-143962, San Francisco, California, USA, Nov. 17-21, 2014, pp. 1-8.
Huawei et al., "Enhancement of Co-Existence Solution C," SA WG2 Meeting #106, S2-143991, San Francisco, California, USA, Nov. 17-21, 2014, pp. 1-3.
LG Electronics, "Clarificaiton on the RAN Assistance Parameters Based on RAN WGs Agreements," SA WG2 Meeting #105, S2-143437, Sapporo, Japan, Oct. 13-17, 2014, 2 pages.

* cited by examiner

METHOD FOR DETERMINING WHETHER TO OFFLOAD TRAFFIC TO WLAN

CROSS REFERENCE TO RELATED APPLICATIONS

This application is the National Phase of PCT International Application No. PCT/KR2015/008360, filed on Aug. 10, 2015, which claims priority under 35 U.S.C. 119(e) to U.S. Provisional Application No. 62/103,082, filed on Jan. 14, 2015, No. 62/104,085, filed on Jan. 16, 2015 and No. 62/105,214, filed on Jan. 20, 2015, all of which are hereby expressly incorporated by reference into the present application.

BACKGROUND OF THE INVENTION

Field of the Invention

The present invention relates to a mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| Reference point | Description |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 4b.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, with an explosive increase in data in recent years, a 3GPP access of a mobile communication operator is becoming more congested. As a way of solving this problem, there is an attempt to offload data of a user equipment (UE) through a WLAN which is a non-3GPP access. Hereinafter, an architecture for connecting the WLAN to an EPC is described.

FIG. 6a and FIG. 6b illustrate an architecture for connecting a WLAN to an EPC.

FIG. 6a illustrates an architecture in which a WLAN is connected to a P-GW through an S2a interface. As can be seen with reference to FIG. 6a, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 6b illustrates an architecture in which a WLAN is connected to a P-GW through an S2b interface. As can be seen with reference to FIG. 6b, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface.

Hereinafter, a trusted WLAN and an untrusted WLAN may be both referred to as a WLAN.

Meanwhile, with a trend for offloading data of a UE not through a 3GPP access of an operator but through a WLAN which is a non-3GPP access, a technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

FIG. 7a is an exemplary diagram of the IFOM technology.

Referring to FIG. 7a, the IFOM technology is to provide the same PDN connection through several pieces of different access. Such IFOM technology provides seamless offloading onto a WLAN.

Furthermore, the IFOM technology provides the transfer of IP flows having the same one PDN connection from one access to the other access.

FIG. 7b is an exemplary diagram of the MAPCON technology.

As can be seen with reference to FIG. 7b, the MAPCON technology is to connect several PDN connections, easily, IP flows to other APNs through another access system.

In accordance with such MAPCON technology, the UE 10 can generate a new PDN connection on access that has not been used before. Alternatively, the UE 10 can generate a new PDN connection in one of several pieces of access that were used before. Alternatively, the UE 10 may transfer some of or all PDN connections to another access.

As described above, with the help of the technologies capable of offloading the traffic of UE onto a WLAN, the congestion of the core network of a mobile communication service provider can be reduced.

The provider provides a policy to the UE in order to divert the traffic onto a general data communication network and the UE may divert data thereof onto the wireless LAN according to the policy.

In order to provision the policy the UE, a 3GPP based access network discovery and selection function (ANDSF) is enhanced to provide a policy associated with the wireless LAN.

FIGS. 8a and 8b show network control entities for selecting an access network.

As can be seen with reference to FIG. 8a, the ANDSF may be present in the home network (Home Public Land Mobile Network (hereinafter called 'HPLMN')) of the UE 10. Furthermore, as can be seen with reference to FIG. 8b, the ANDSF may also be present in the Visited Public Land Mobile Network (hereinafter called 'VPLMN') of the UE 10. When the ANDSF is present in a home network as described above, it may be called an H-ANDSF 61. When the ANDSF is present in a visited network, it may be called a V-ANDSF 62. Hereinafter, the ANDSF 60 generally refers to the H-ANDSF 61 or the V-ANDSF 62.

The ANDSF can provide information about an inter-system movement policy, information for access network search, and information about inter-system routing, for example, a routing rule.

The aforementioned IFOM is performed by a leading determination of the UE and a dual stack mobile IP (DSMIP) which is a host based mobility protocol is used.

Meanwhile, a technology that provides the IFOM through S2a and S2b interfaces using a GTP or a PMIP which is a network based protocol is referred to as network based IP flow mobility (NBIFOM).

However, various policies for offloading the traffic of the user exist as described above, and as a result, various policies may conflict with each other in the UE.

SUMMARY OF THE INVENTION

Accordingly, an object of the present invention is to present a method that can solve the aforementioned problem.

In one aspect, a method for determining whether to offload traffic of a user equipment (UE) to a wireless local area network (WLAN) is provided. The method may be performed by a network entity in charge of a control plane. The method may include acquiring subscriber information on the UE from a subscriber information server. Herein, the subscriber information may include a WLAN offloadability indication for a specific packet data network (PDN) connection. The method may include: determining WLAN offloadability for the specific PDN connection on the basis of the WLAN offloadability indication and configuration information; transmitting the WLAN offloadability indication to network nodes according to the determination; and transmitting the WLAN offloadability indication to the UE according to the determination.

The network nodes may include a serving gateway (S-GW) and a PDN gateway (P-GW).

A network based IP flow mobility (NBIFOM) function indication may be transmitted together with the WLAN offloadability indication.

The transmitting of the WLAN offloadability indication to the network nodes may include transmitting a session generation request message including the WLAN offloadability indication to the P-GW through the S-GW.

The session generation request message may further include the NBIFOM function indication.

In another aspect, a method for supporting network based IP flow mobility (NBIFOM) in a mobile communication network is also provided. The method may be performed by a gateway. The method may include: receiving NBIFOM function indications of a user equipment (UE) and network nodes and a WLAN offloadability indication for a specific PDN; determining whether the specific PDN is offloaded to a WLAN on the basis of the function of the NBIFOM of the gateway, the received NBIFOM function indications, and the received WLAN offloadability indication; and transmitting a result that the NBIFOM is disabled to the UE and the network nodes when it is determined that the specific PDN is disabled to be offloaded to the WLAN according to the received WLAN offloadability indication even though the NBIFOM is enabled to be activated according to the NBIFOM function indications.

In yet another aspect, a network entity for determining whether to offload traffic of a user equipment (UE) to a wireless LAN (WLAN) is also provided. The network entity may include a transceiver acquiring subscriber information on the UE from a subscriber information server. Herein, the subscriber information may include a WLAN offloadability indication for a specific packet data network (PDN) connection. The network entity may include a processor determining WLAN offloadability for the specific PDN based on the WLAN offloadability indication and configuration information and thereafter, transmitting the WLAN offloadability indication to network nodes and the UE.

According to a disclosure of the present invention, a problem in the related art can be solved.

In detail, while a policy regarding WALN offloadability of a provider of a visitation network is guaranteed to be flexibly set under a roaming environment, policies acquired by a UE can be prevented from conflicting with each other and a signaling for a request/rejection which may be issued due to the policy confliction can be reduced in advance. Using the signaling in an entire system is reduced to increase efficiency of network resource utilization.

DESCRIPTION OF EXEMPLARY EMBODIMENTS

Figure 1:
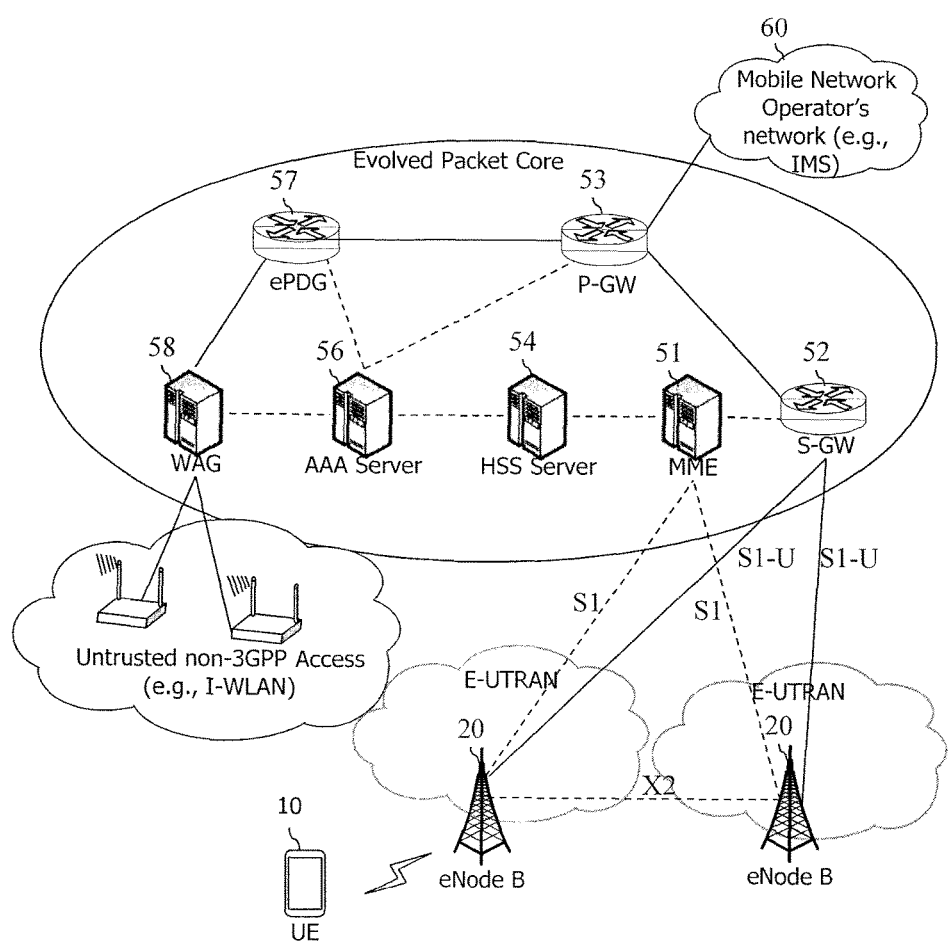
FIG. 1 is a structural diagram of an evolved mobile communication network.
Figure 2:
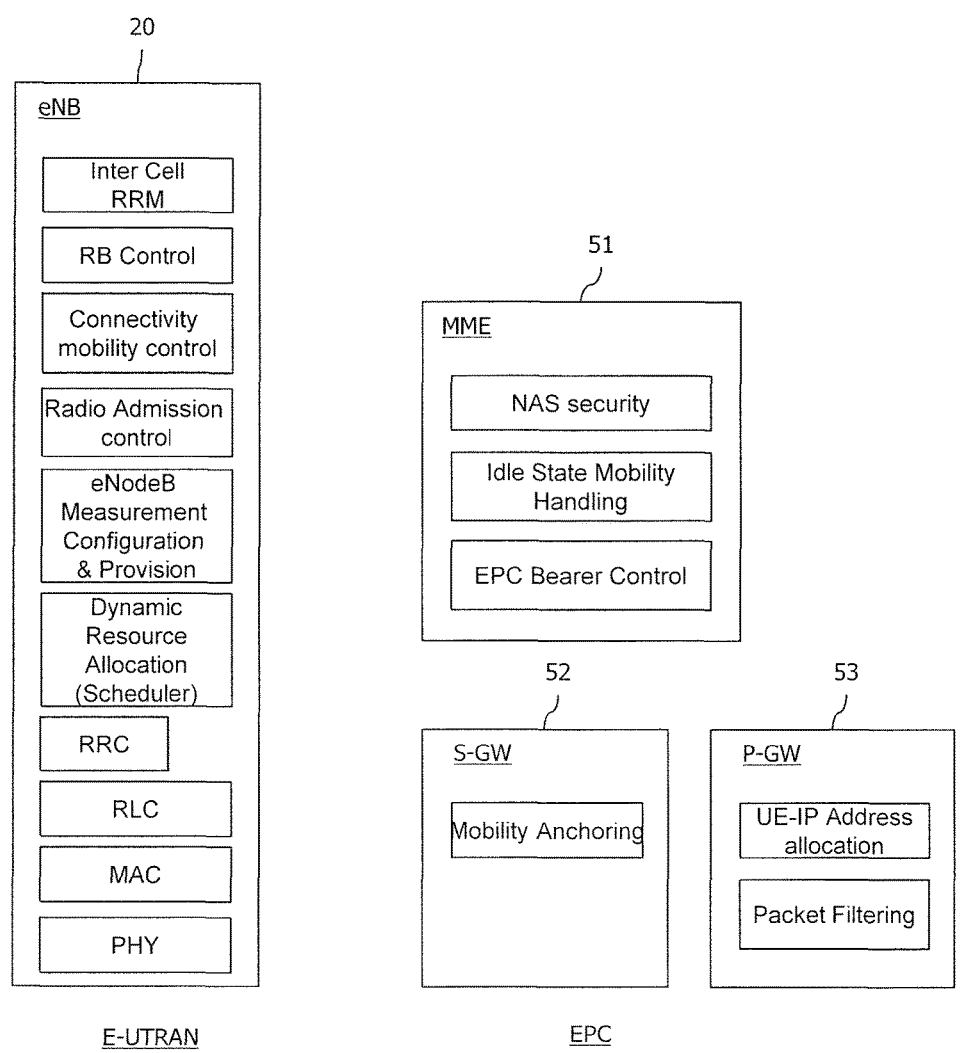
FIG. 2 is an exemplary diagram illustrating architectures of a general E-UTRAN and a general EPC.
Figure 3:
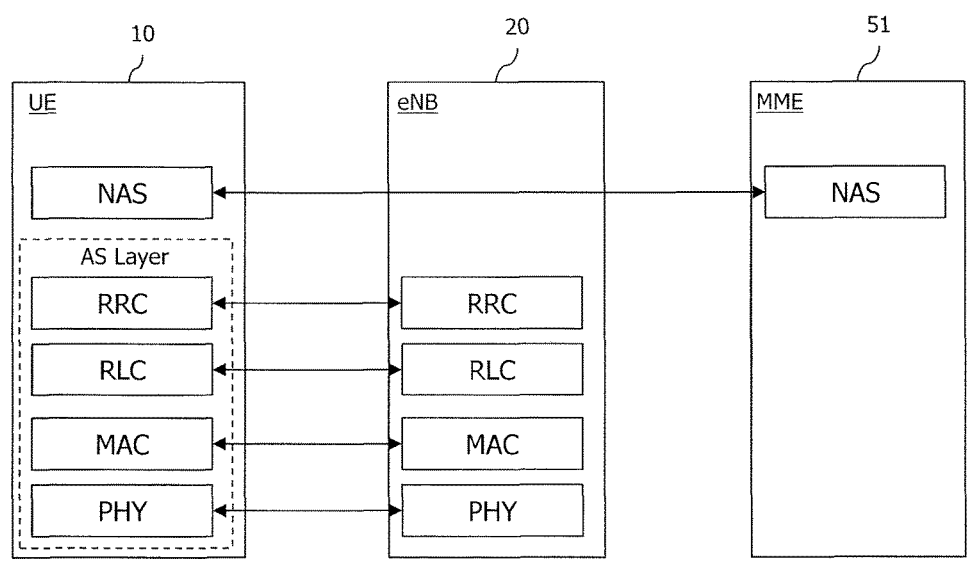
FIG. 3 is an exemplary diagram illustrating a structure of a radio interface protocol on a control plane between UE and eNodeB.
Figure 4:
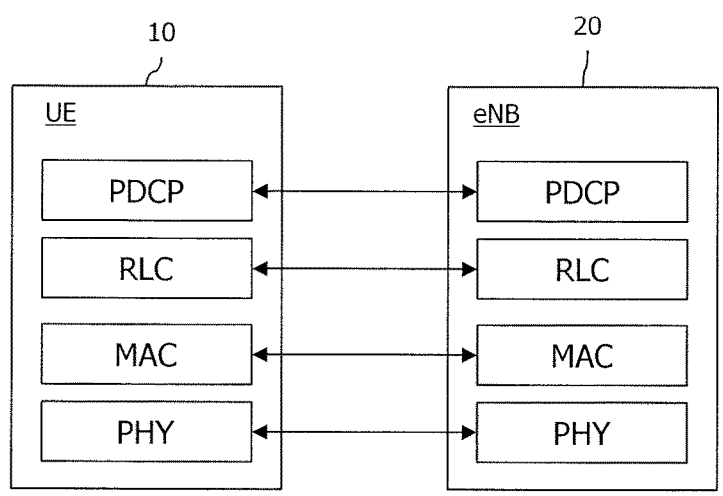
FIG. 4 is another exemplary diagram illustrating a structure of a radio interface protocol on a user plane between the UE and a base station.
Figure 5A:
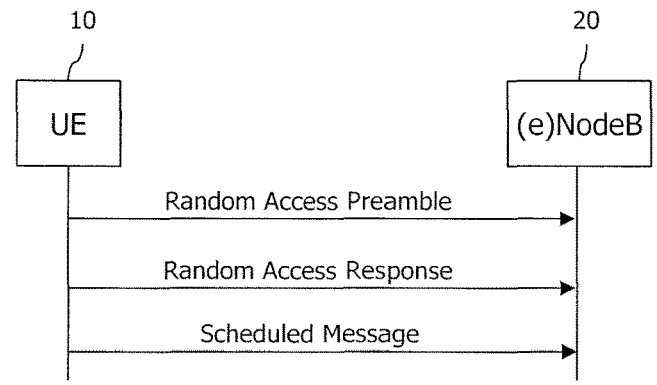
FIG. 5*a* is a flowchart illustrating a random access process in 3GPP LTE.
Figure 5B:
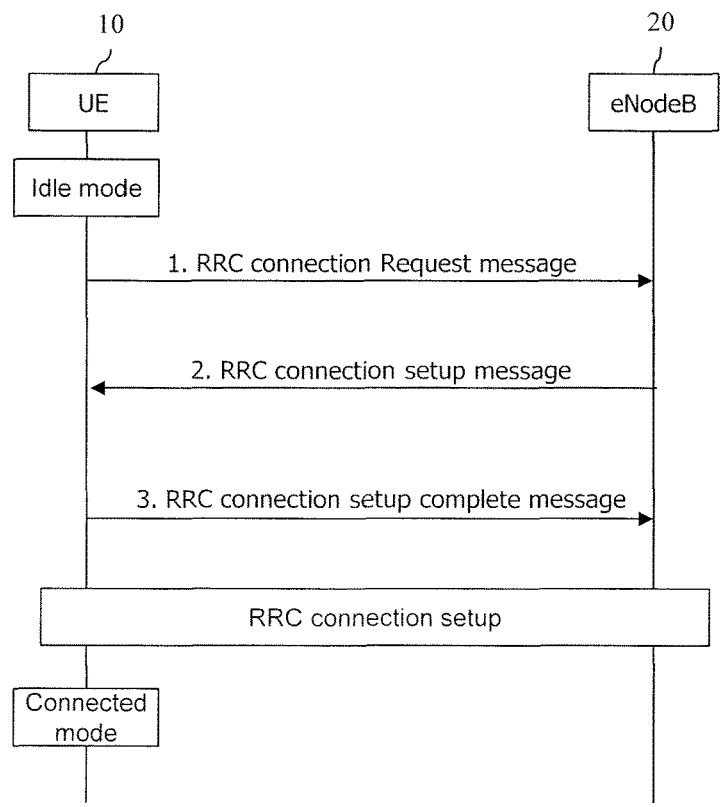
FIG. 5*b* illustrates a connection process in a radio resource control (RRC) layer.
Figure 6A:
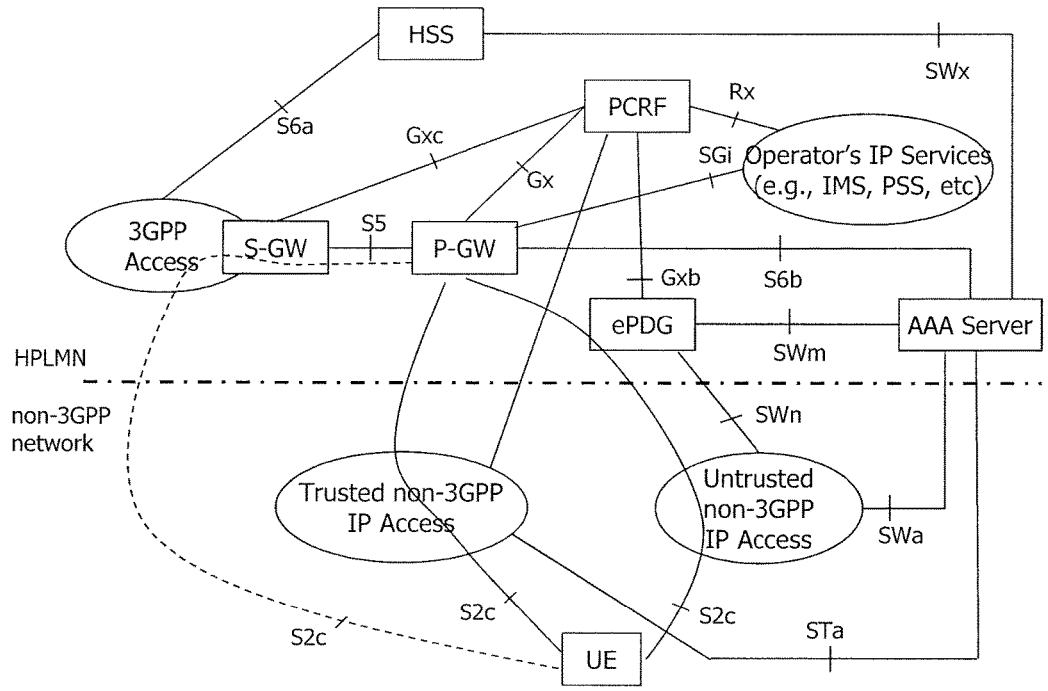
FIG. 6*a* and FIG. 6*b* illustrate an architecture for connecting a WLAN to an EPC.
Figure 6B:
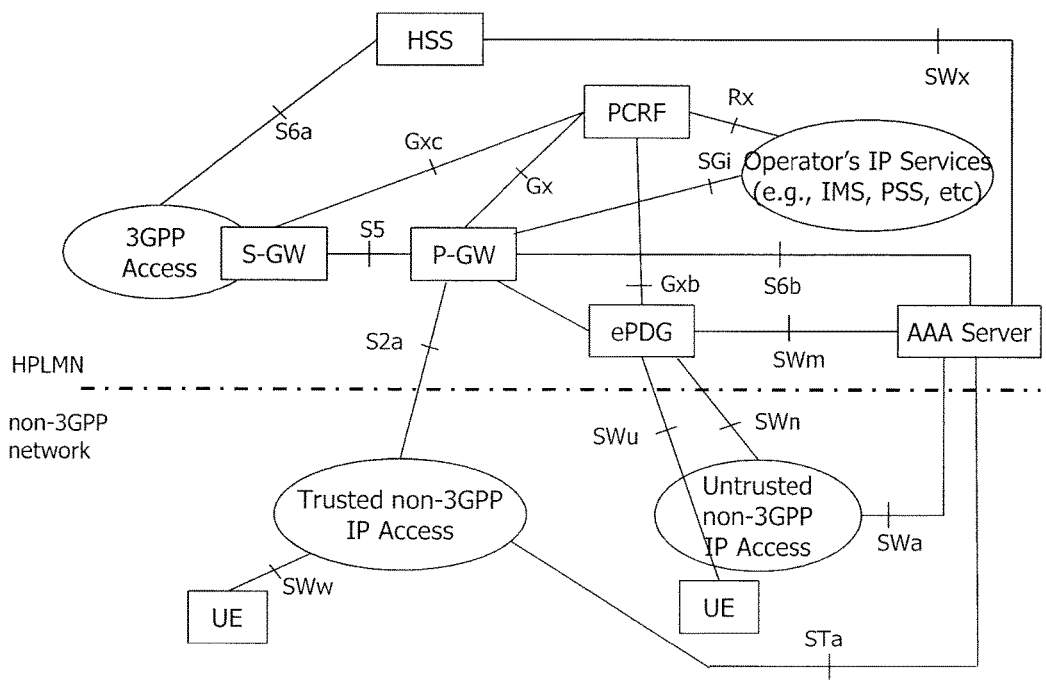
Figure 7A:
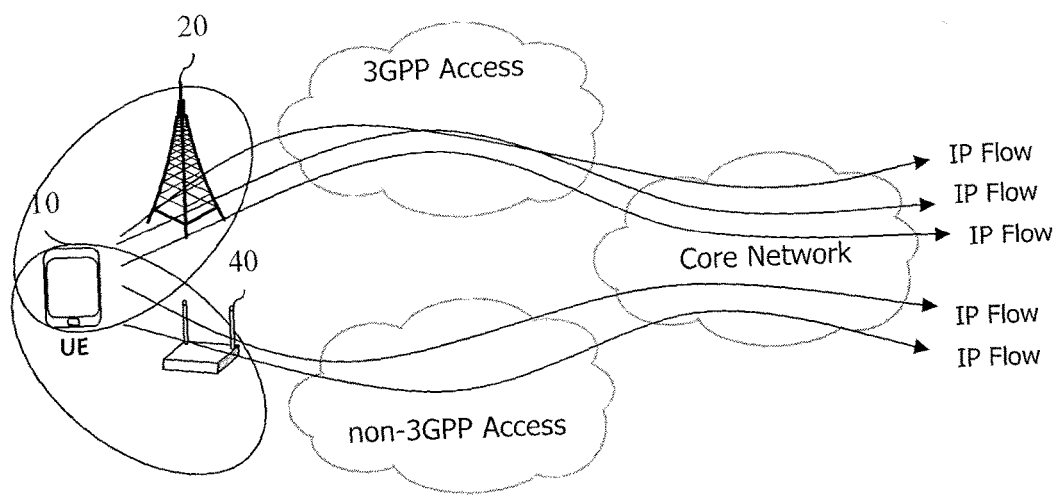
FIG. 7*a* is an exemplary diagram of the IFOM technology.
Figure 7B:
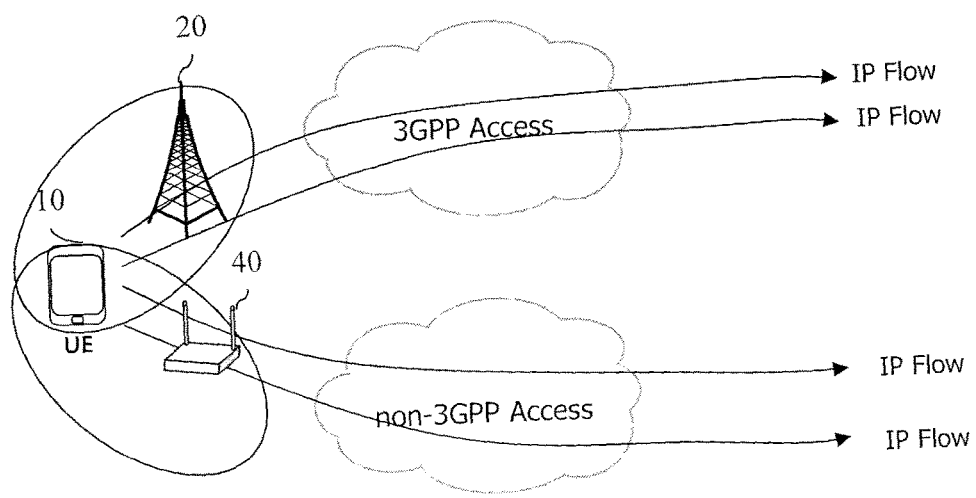
FIG. 7*b* is an examplary diagram of the MAPCON technology.
Figure 8A:
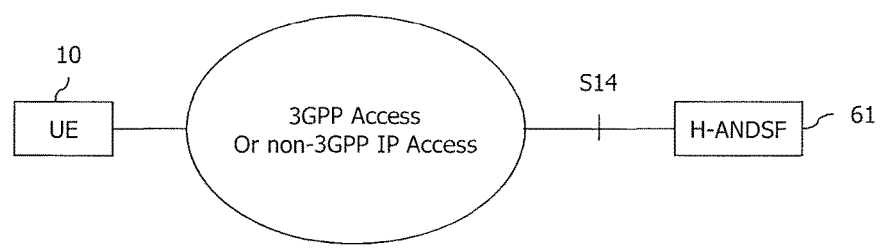
FIG. 8*a* and FIG. 8*b* illustrate network control entities for selecting an access network.
Figure 8B:
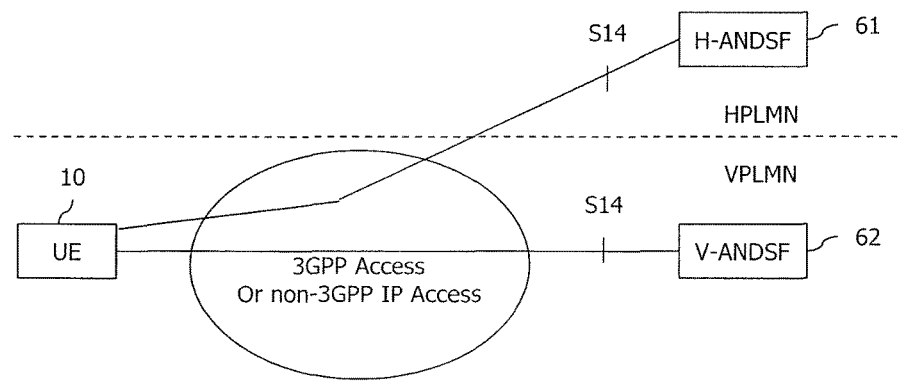

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Local Operating Environment Information: This is a set of implementation specific parameters which describe the local environment in which the UE is operating.

Presence Reporting Area: This is an area defined to report the presence of a UE in a 3GPP packet domain for the reasons of policy control and/or accounting or the like. In case of E-UTRAN, the presence reporting area consists of adjacent or not-adjacent tracking areas or a set of eNodeBs and/or cells. There are two types of presence reporting areas. One is a UE-dedicated presence reporting area, and the other is a presence reporting area predetermined by a core network.

ANDSF(Access Network Discovery and Selection Function): This is one of network entities for providing a policy for discovering and selecting an access that can be used by a UE on an operator basis.

ISRP(Inter-System Routing Policy): This is a rule defined by the operator to indicate which one will be used by the UE for routing of IP traffic among several radio access interfaces. The ISRP may include three types of rules as follows, as a policy for defining an access network preferred (i.e., having a high priority) or restricted to route/steer a packet service (or an IP flow or IP traffic or applications). That is, the ISRP may be divided into an IP flow mobility (IFOM) rule, a multi access PDN connectivity (MAPCON) rule, and a non-seamless WLAN offload (NSWO) rule as follows.

IFOM(IP Flow Mobility) rule: This rule is in regards to a list in which access technologies/access networks to be used by the UE are arranged according to a priority, when traffic matched to a specific IP traffic filter can be routed on a specific APN or on any APN. Further, this rule may designate for which radio access the traffic matched to the specific IP traffic filter is limited on the specific APN or on the any APN.

MAPCON(Multi Access PDN Connectivity) rule: This rule is a list in which the access technologies/access networks to be used by the UE are arranged according to the priority when a PDN connection for the specific APN can be routed. Further, this rule may designate for which radio access a PDN connection to a specific APN will be limited.

NSWO(Non-seamless WLAN offload) rule: This rule designates whether certain traffic will be offloaded or not offloaded non-seamlessly to a WLAN.

ISMP(Inter-System Mobility Policy): This is a set of rules defined by an operator to have an impact on an inter-system mobility decision made by the UE. When the UE can route IP traffic on a single radio access interface, the UE may use ISMP to select the most appropriate access technology type or access network in a given time.

RAN rule: This is to evaluate an RAN rule programmed in the UE and having radio access network (RAN) assistance parameters received from the network. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. In this case, the UE selects the WLAN and moves all offloadable PDN connections to the WLAN. Alternatively, when the RAN rule for moving the traffic to the 3GPP access is satisfied, the AS layer of the UE delivers a move-traffic-from-WLAN indication to the higher layer of the UE. In this case, the UE moves all PDN connections on the WLAN through 3GPP. 3GPP TS 23.401, TS 23.060, TS 23.402, TS 36.300, TS 36.304, TS 36.331, TS 25.304, and TS 25.331 may be incorporated herein by reference to know detailed descriptions on the RAN rule.

Multi-access PDN connection: This is a PDN connection in which traffic can be routed to the 3GPP access and/or the WLAN access. Each IP flow is routed only to one access at one instance.

<RAN Support Parameter>

In recent years, apart from the policies provided by the ANDSF, there has been a movement to define a policy for deciding a detour to the WLAN centered on a mobile communication service provider. Under the movement, a RAN support parameter has been proposed in recent years.

Figure 9A:
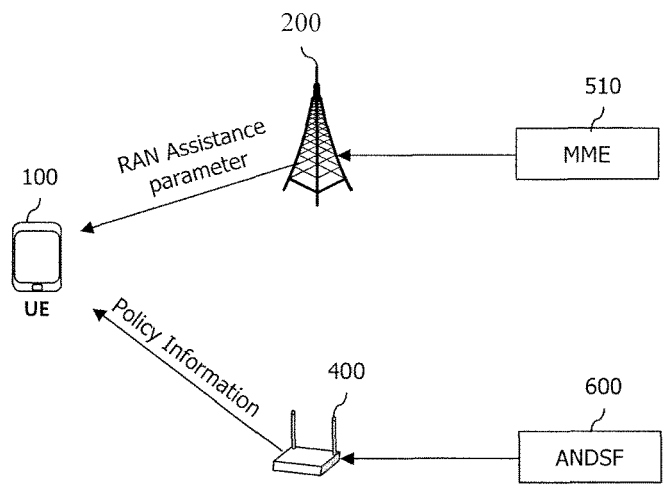
FIG. 9*a* illustrates an example in which a RAN support parameter (RAN rule) newly defined is provided to UE in addition to an ANDSF policy.

FIG. 9a illustrates an example in which a RAN support parameter (RAN rule) newly defined is provided to UE in addition to an ANDSF policy.

As illustrated in FIG. 9a, an ANDSF 600 may provide policy information to UE 100, but a base station 200 of an E-UTRAN (alternatively, UTRAN) may provide a newly defined radio access network (RAN) support parameter to the UE 100.

The RAN support parameter may be transferred through RRC signaling. The RAN support parameter may include threshold values for the strength and the quality of an E-UTRAN signal, a threshold value for a WLAN channel use rate, a threshold value for a WLAN backhaul data transmission rate, a list of a WLAN identifier, and an offload preference indicator (OPI). The UE may use the RAN support parameter for access network selection between a 3GPP access and a WLAN access and routing of traffic.

For the routing of the traffic, the MME may transfer to the UE information indicating which PDN connection may be offloaded to the WLAN and information indicating which PDN connection may not be offloaded to the WLAN. The MME may provide the information for each PDN connection. In detail, the MME may transfer the information when the PDN connection is established.

Meanwhile, in order for the provider to permit or prohibit WLAN offloading for each user or for each APN, subscriber information in an HSS may include an indication indicating whether the WLAN offloading is permitted or prohibited with respect to a specific PDN.

The MME may determine whether the offloading to the WLAN is permitted with respect to the UE and the PDN connection.

The MME determines offloadability for the PDN connection based on the subscriber information and an internally set policy.

When the UE establishes a new PDN connection, the MME may indicate whether the PDN connection may be offloaded to the WLAN.

The MME may provide to the UE an update indication of the WLAN offloadability for the PDN connection. This may be initiated through an insert subscriber data procedure of the HSS. Further, this may be initiated through a bearer modification procedure.

The UE may consider WLAN offloadability information provided from the MME at the time of performing the traffic offloading/handover between the 3GPP access and the WLAN access.

When the UE receives a WLAN offloadability indication for the PDN connection, the UE stores the indication while the PDN connection is maintained and performs an update at the time of receiving a new indication.

Meanwhile, the indication indicating whether the PDN connection may be offloaded to the WLAN is transferred from a source MME to a target MME during a mobility management procedure. This may allow the target MME to learn the indication previously provided to the UE and the indication updated therethrough may be provided to the UE.

Figure 9B:
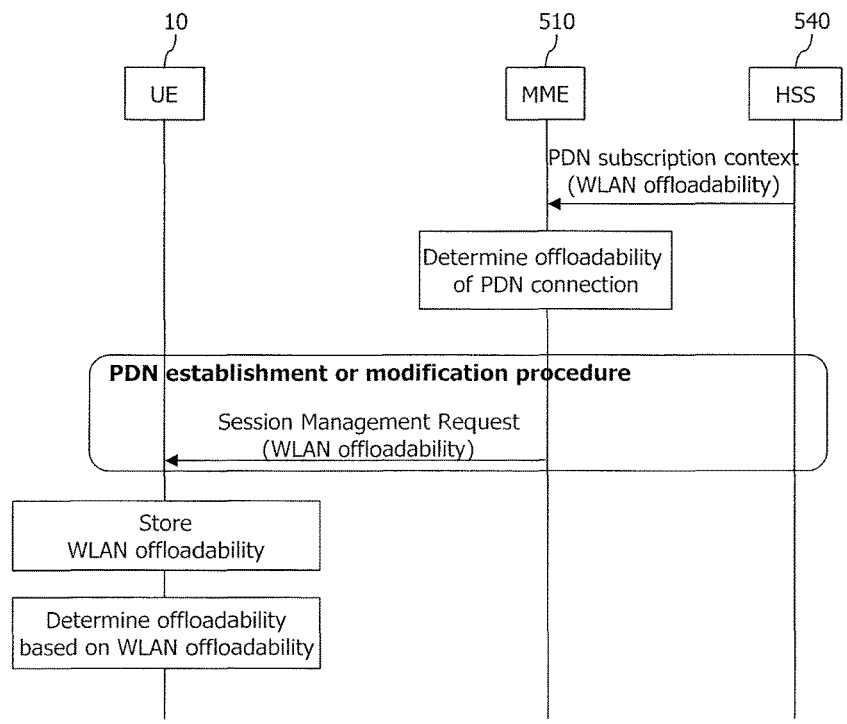
FIG. 9*b* is an exemplary diagram specifically illustrating a procedure of providing the RAN support parameter (RAN rule) illustrated in FIG. 9*a* to the UE.

FIG. 9b is an exemplary diagram specifically illustrating a procedure of providing the RAN support parameter (RAN rule) illustrated in FIG. 9a to the UE.

As known by referring to FIG. 9b, the HSS 540 may transfer the WLAN offloadability shown in Table 2 given below to the MME 510. The WLAN offloadability may be transferred through a PDN subscriber context illustrated in FIG. 9b, but transferred to the MME during a location update procedure.

TABLE 2

| WLAN offloadability | indicating whether the traffic connected with the APN may be offloaded to the WLAN or should be maintained on the 3GPP access |
|---|---|

Then, the MME 510 determines whether the PDN connection is offloaded based on the WLAN offloadability transferred from the HSS.

In addition, the MME 510 may transfer the WLAN offloadability indication to the UE 100 during a PDN establishment procedure or modification procedure.

<Network Based IP Flow Mobility (NBIFOM)>

A technology that provides IFOM through S2a and S2b interfaces using a GTP or a PMIP which is a network based protocol is referred to as network based IP flow mobility (NBIFOM). IN the NBIFOM, the UE supports the 3GPP access and the WLAN access. The NBIFOM may be classified into UE-initiated NBIFORM and network-initiated NBIFOM according to who first performs triggering.

UE-initiated NBIFOM: Mapping between IP flows and access links, which is desired by the UE may be provided to a PGW. In this case, the network may just accept or reject IP flow mobility of the UE and the network may not autonomously initiate the IP flow mobility Network-initiated NBIFOM: Mapping between the IP flows and the access links, which is desired by the network may be provided to the UE. In this case, the UE may just accept or reject the IP flow mobility by the network and the UE may not autonomously initiate the IP flow mobility.

Only when an NBIFOM function supports both the UE and the network, the NBIFOM function is activated. Therefore, a discovery/negotiation process of the NBIFOM function is required.

When the discovery/negotiation process is described in detail, the UE transfers an NBIFOM function indication to the network during an initial PDN connection establishment procedure. When the network also supports the NBIFOM function, a P-GW 530 confirms supporting the NBIFOM.

A more detailed procedure will be descried with reference to drawings.

Figure 10:
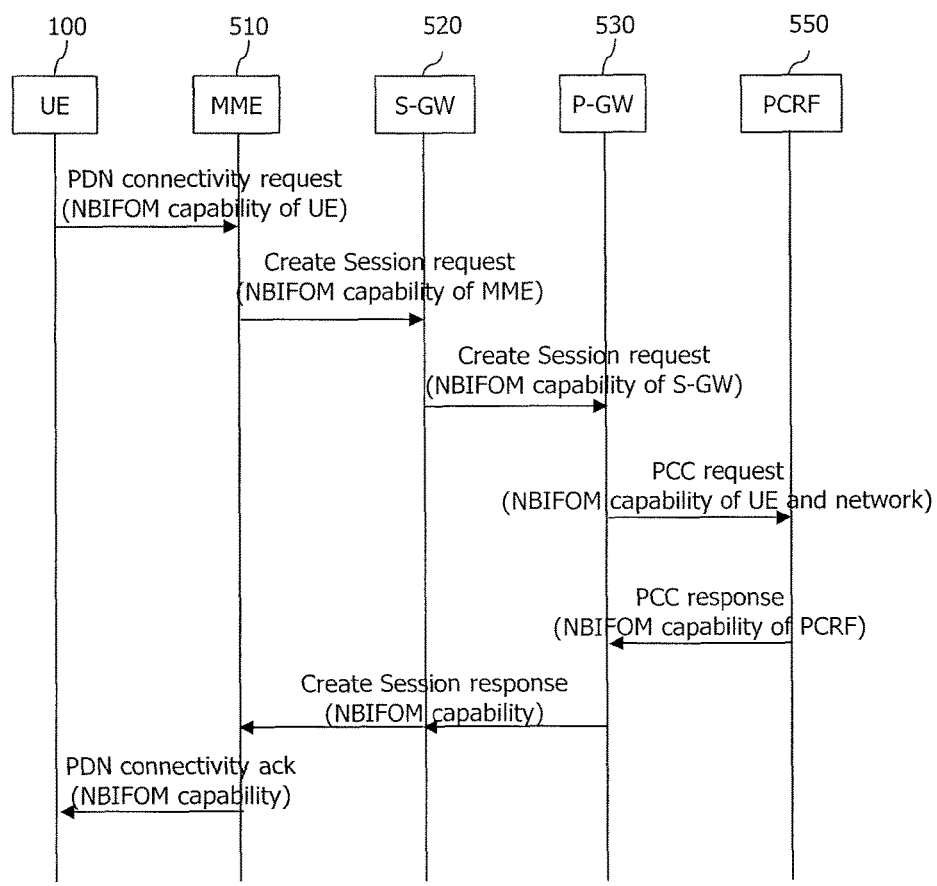
FIG. 10 illustrates an example in which an NBIFOM function is discovered/negotiated during a PDN connection establishment procedure.

FIG. 10 illustrates an example in which an NBIFOM function is discovered/negotiated during a PDN connection establishment procedure.

As known by referring to FIG. 10, the UE 100 transmits a PDN connectivity request message including the NBIFOM function indication.

Each of the MME 510 and an S-GW 520 transmits a session generation request message including the NBIFOM function indication thereof During IP-CAN session establishment, the P-GW 530 transfers a PCC request message including the NBIFOM function indications and RAT types of the UE and the P-GW to a PCRF 600.

Then, the PCRF 600 transfers a PCC response message including the NBIFOM function indication thereof to the P-GW 530.

Then, the P-GW 530 transfers a session generation response message including the NBIFORM function indication to the MME 510. In addition, the MME 510 transfers a PDN connection confirmation message to the UE 100.

Meanwhile, when a routing rule for the NBIFOM is updated, the PCRF 600 may be transferred to the UE 100 through the P-GW 530. This is described below with reference to drawings.

Figure 11:
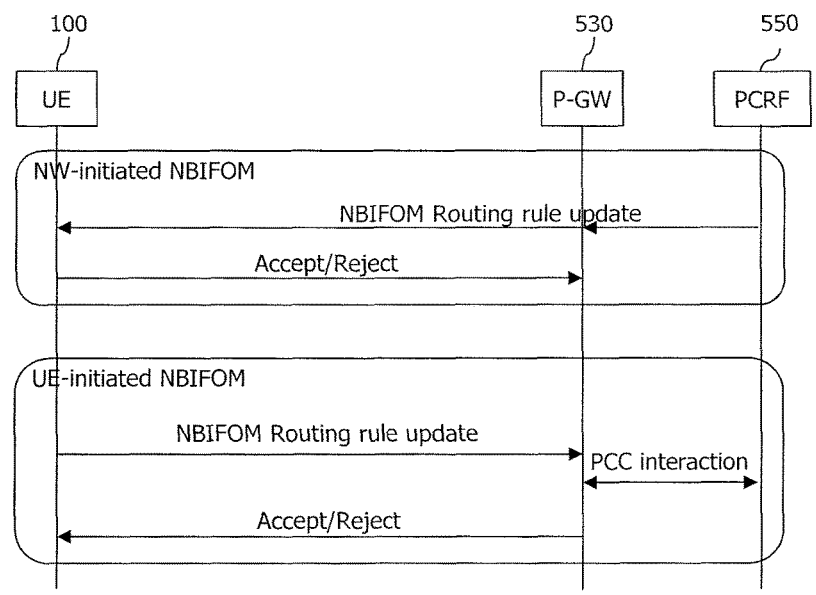
FIG. 11 illustrates a process of transferring an update of a routing rule for NBIFOM.

FIG. 11 illustrates a process of transferring an update of a routing rule for NBIFOM.

As known by referring to FIG. 11, transferring the updated routing rule may vary depending on whether the network initiates the NBIFOM or the UE initiates the NBIFOM.

First, in the case of the NBIFOM initiated by the network, the PCRF 600 may trigger the update of the routing rule for the NBIFOM and the updated routing rule may be transferred to the P-GW 530 during a session modification procedure.

The P-GW 530 transfers the routing rule to the UE 100 through the S-GW 520 and the MME 510. In detail, when the P-GW 530 receives a policy regarding the update of the routing rule from the PCRF 600 and the corresponding PDN connection is routed to both the 3GPP access and the WLAN access, the P-GW 530 may transfer the routing rule on the 3GPP access and the WLAN access.

In this case, the UE 100 may accept/reject the updated routing rule. Therefore, the P-GW 530 may not adopt the updated routing rule before the UE 100 confirms the updated routing rule.

Meanwhile, in the case of the NBIFOM initiated by the UE, the UE 100 transfers the updated routing rule to the P-GW 530. In detail, when the corresponding PDN connection is routed to both the 3GPP access and the WLAN access, the UE 100 may transfer the routing rule on the 3GPP access and the WLAN access.

Figure 12:
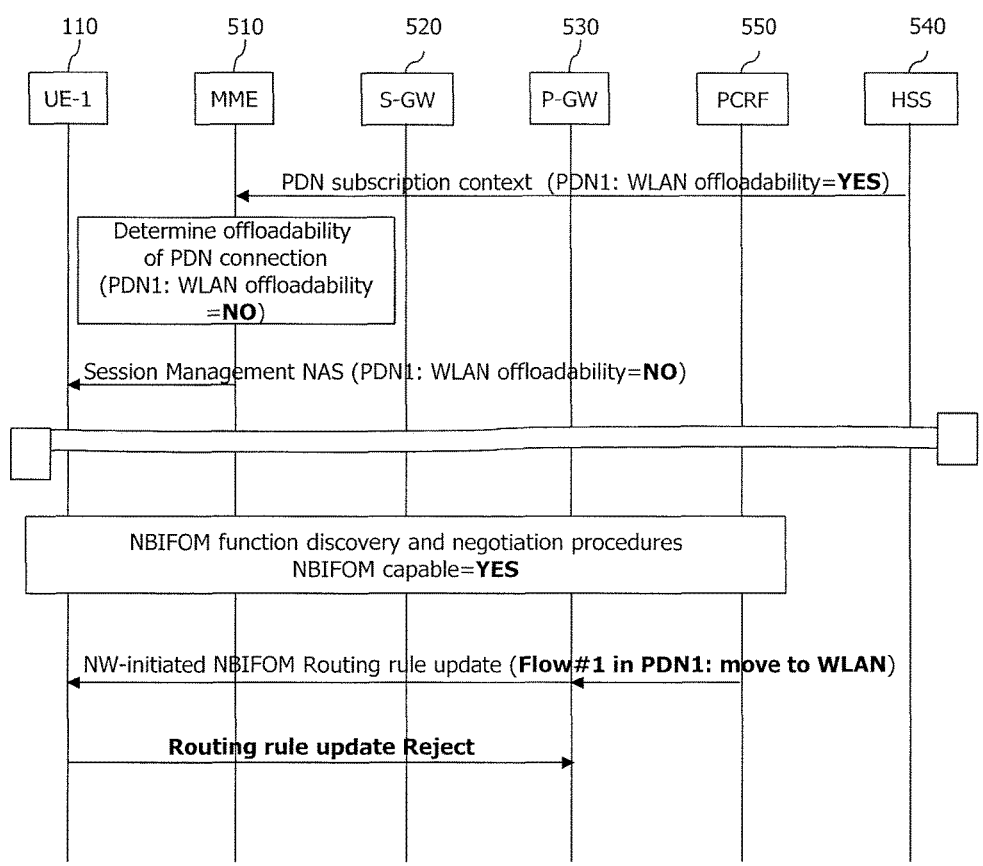
FIG. 12 illustrates one example in which indications for WLAN offloadability conflict with each other.

FIG. 12 illustrates one example in which indications for WLAN offloadability conflict with each other.

Referring to FIG. 12, the MME 510 receives the subscriber information through the PDN subscriber context from the HSS. The subscriber information includes the WLAN offloadability indication used in an interworking solution using the RAN support parameter (RAN rule).

Then, the MME 510 determines whether to offload the PDN connection identified by PDN 1 to the WLAN based on the WLAN offloadability indication. In this case, according to the WLAN offloadability indication, even though it may be possible to offload the PDN connection identified by the PDN 1, if the UE is roaming, the MME 510 may determine that the PDN connection identified by the PDN 1 is not offloaded to the WLAN according to a policy for the roaming.

Then, the MME 510 transfers the indication PDN 1 (WLAN offloadability=No) indicating that the PDN connection identified by the PDN 1 is not offloaded to the WLAN to the UE 100 during the PDN establishment or modification procedure.

Meanwhile, the NBIFOM function discovery/negotiation process is performed during the PDN connection configuring/modifying procedure and whether the corresponding PDN may move by the unit of an IP flow through the NBIFOM is negotiated by considering the NBIFOM functions of the UE and network nodes. In FIG. 12, a result that the IP flow mobility is available with respect to the PDN connection identified by the PDN 1 is transferred to the UE.

Therefore, the P-GW 530 may request the UE to add/update the routing rule for the IP flow mobility for the corresponding PDN by triggering the PCRF, and the like.

Then, a situation occurs, in which the UE 100 needs to perform the IP flow mobility with respect to the PDN I that receives the indication that the offloading to the WLAN is impossible.

That is, different policies conflict with each other in the UE 100 and there is a possibility that the UE 100 will reject the routing rule update request from the network.

When multiple UEs face such a situation, unnecessary signaling is transmitted/received in an entire system, and as a result, resources are wasted and utilization of network resources deteriorates.

<Disclosure of Present Specification>

Accordingly, the present specification proposes a mechanism for a dual mode UE supporting a cellular access network and a WLAN access network in a mobile communication system such as 3GPP GSM/UMTS/evolved packet system (EPS) to efficiently provide IP flow mobility. The proposal according to the present specification is constituted by a combination of one or more operations among the following operations.

MME transfers WLAN offloadability indication to network nodes

In the related art, the MME transfers the WLAN offloadability indication determined with respect to a specific PDN connection only to the UE through a NAS message, but according to the proposal of the present specification, the MME transfers the WLAN offloadability indication for the PDN connection to the network nodes (P-GW, S-GW, PCRF, etc.).

In order to transfer the WLAN offloadability indication to the S-GW/P-GW or PCRF, session establishment/modification and PCC interaction procedures (IP-CAN session establishment/modification procedure) may be used as the procedure and a GTP protocol and a Gx protocol may be used as the protocol. Further, the WLAN offloadability indication may be transferred during the NBIFOM function discovery/negotiation procedure. In this case, the MME has the NBIFOM function, but when the MME does not intend to offload the PDN of a specific APN to the WLAN, the MME may announce that the MME does not have the NBIFOM function to the S-GW/P-GW or the PCRF.

Alternatively, the WLAN offloadability indication may be transferred through a new separate procedure or message.

Meanwhile, when the WLAN offloadability indication is changed while the subscriber information is changed, the updated indication as information is transferred even to the network node similarly to the case where the updated indication is transferred to the UE. The NBIFOM function indication and the WLAN offloadability indication transferred to the network node may be transferred in a separated form, but transferred as one indication. For example, the WLAN offloadability indication is reflected to the NBIFOM function indication to transfer not the NBIFOM function itself of the network node but the corresponding indication containing processed information.

As a more optimized scheme, the information may be transferred only to the PDN in which the IP flow mobility by an NBIFOM solution may be performed without the need for continuously transferring the WLAN offloadability indication to the network. For example, when there is no NBIFOM function of the UE or a network intermediate node, the information of the WLAN offloadability indication may not be meaningful in the P-GW or the PCRF, and as a result, the information need not be transferred any longer and when there is a possibility that the NBIFOM connection will be configured at any moment, the WLAN offloadability indication needs to be updated between the network nodes.

Meanwhile, the WLAN offloadability indications are different from each other for each access network, the respective indications may be transferred to the network node similarly to a case where information on the respective access networks is transferred to the UE.

II. Determining NBIFOM function of corresponding PDN by considering the received indication during NBIFOM function negotiation process The PCRF or P-GW confirms the transferred WLAN offloadability indication of the corresponding PDN in addition to the function of the UE for the NBIFOM, the functions of the network nodes, and the function of the PCRF or P-GW.

Even though all other conditions for the NBIFOM are satisfied, the PCRF or P-GW transfers a result that the NBIFOM is impossible to the network and the UE if the WLAN offloading is impossible.

When the WLAN offloadability indications are different from each other for each access network, since whether the NBIFOM is possible varies for each access network, separate distinguished information may be transferred.

III. Operation of P-GW/PCRF receiving the indication information

The P-GW/PCRF performs the NBIFOM negotiation process, but manages the corresponding PDN so as not to request the routing rule for the NBIFOM initialized by the network. That is, the P-GW/PCRF includes particular marking information to manage the PDN context. In detail, the P-GW/PCRF may not create a request message required for an update procedure of the routing rule for the NBIFOM initialized by the network or the created request message may not be transmitted to the UE.

Alternatively, even though a condition is satisfied, in which the IP flow mobility to the WLAN needs to be performed by the routing rule regardless of the update of the routing rule which the P-GW/PCRF has or receives in the middle, the P-GW/PCRF does not perform an operation for performing the IP flow mobility. The P-GW/PCRF prevents the traffic from being transmitted to the WLAN.

Alternatively, when the P-GW/PCRF intends to transmit a response message to the update request of the routing rule for the NBIFOM initiated by the UE, the P-GW/PCRF determines the update based on the indication information received from the MME. For example, the P-GW/PCRF may reject the update request of the UE if the WLAN offloadability information received from the MME is NO.

An operation of a purpose for preventing even the UE from transporting the traffic to the WLAN may be performed similarly to the operation of the P-GW/PCRF.

IV. Adding provider information indicating whether to consider WLAN offloadability indication when additionally configuring NBIFOM PDN connection In order to provide flexibility in operating the policy for each provider, whether to perform the NBIFOM function negotiation may be included in the subscriber information by considering the WLAN offloadability indication.

The information may be transferred from the MME to multiple network nodes during the NBIFOM function negotiation process.

Alternatively, if the information is managed for each subscriber, the information may be previously configured in the network node.

Although a control plane based solution scheme of the NBIFOM is described hereinabove, the above-mentioned description may be extensively applied even to a user plane based solution scheme.

Meanwhile, hereinafter, an operation scheme according to the disclosure of the present specification will be described with reference to drawings.

Figure 13:
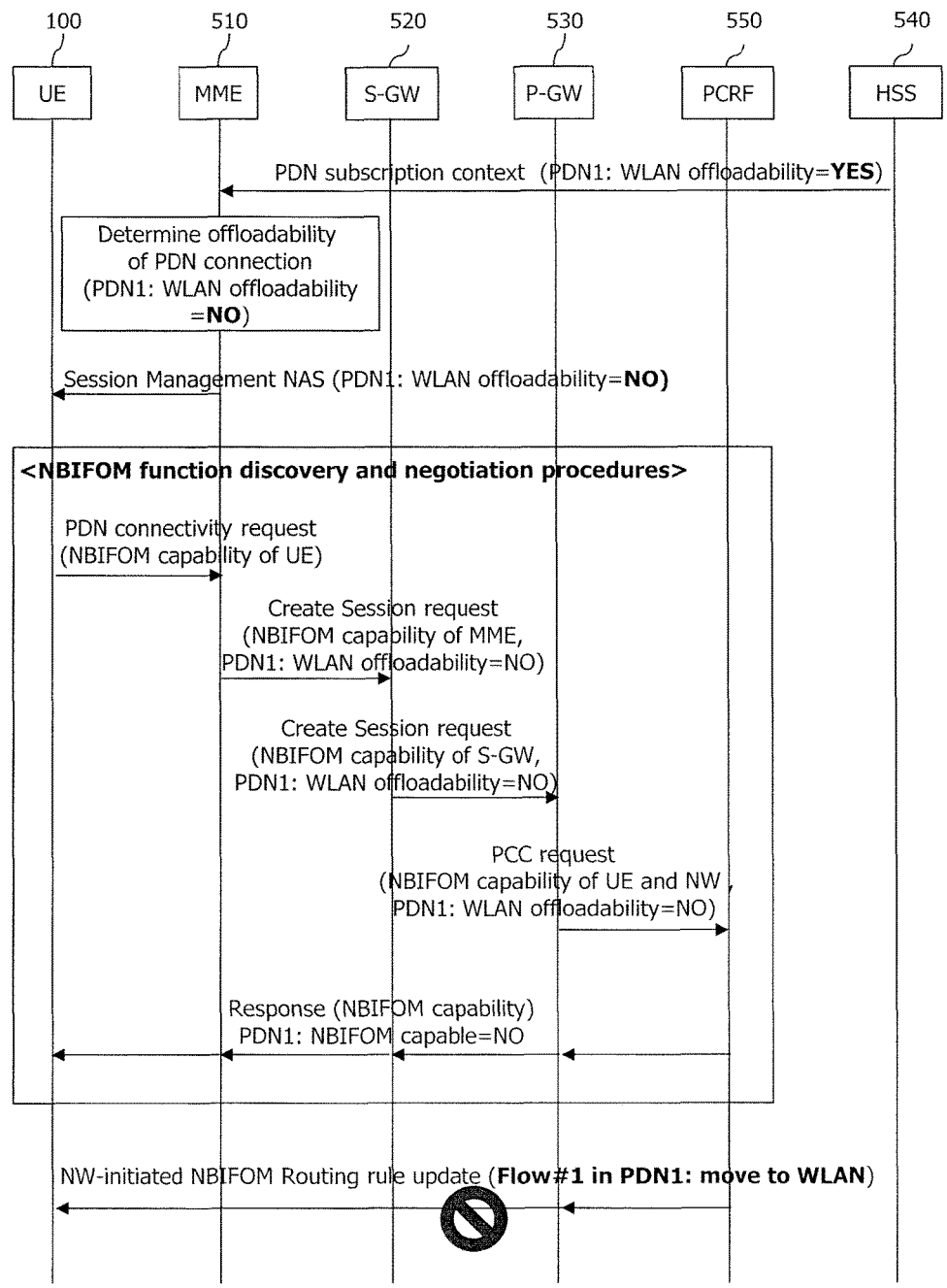
FIG. 13 is a signal flowchart illustrating a solution scheme according to one disclosure of the present specification.

FIG. 13 is a signal flowchart illustrating a solution scheme according to one disclosure of the present specification.

In FIG. 13, it is exemplarily illustrated that the MME 510 determines that the PDN connection identified by the PDN 1 is not offloaded to the WLAN. Then, the MME 510 transfers the session generation request message including the indication PDN 1 (WLAN offloadability=No) indicating that the PDN connection identified by the PDN 1 is not offloaded to the WLAN to the S-GW 520 and the P-GW 530 during the PDN connection request process.

In detail, referring to FIG. 13, the MME 510 receives the subscriber information from the HSS through the PDN subscriber context. The subscriber information includes the WLAN offloadability indication which is a part of the RAN support parameter (RAN rule).

Then, the MME 510 determines whether to offload the PDN connection identified by PDN 1 to the WLAN based on the WLAN offloadability indication which is a part of the RAN support parameter. In this case, according to the WLAN offloadability indication which is a part of the RAN support parameter (RAN rule), even though it may be possible to offload the PDN connection identified by the PDN 1 to the WLAN, if the UE 100 is roaming, the MME 510 may determine that the PDN connection identified by the PDN 1 is not offloaded to the WLAN according to the policy for the roaming.

Then, the MME 510 transfers the indication indicating that the PDN connection identified by the PDN 1 is not offloaded to the WLAN to the UE 100 during the PDN establishment or modification procedure.

Meanwhile, the NBIFOM function discovery/negotiation process is performed during the PDN connection configuring/modifying procedure. In detail, the UE 100 transmits the PDN connectivity request message including the NBIFOM function indication.

Then, the MME 510 transfers the session generation request message including the indication PDN 1 (WLAN offloadability=No) indicating that the PDN connection identified by the PDN 1 is not offloaded to the WLAN to the S-GW 520 according to the previous determination together with the NBIFOM function indication thereof. Then, the S-GW 520 transmits the session generation request message to the P-GW 530 to transfer the indications to the P-GW 530.

During IP-CAN session establishment, the P-GW 530 transfers a PCC request message including the indication PDN 1 (WLAN offloadability=No) indicating that the PDN connection identified by the PDN 1 is not offloaded to the WLAN to the PCRF 600 together with the NBIFOM function indications of the UE 100 and the P-GW 530.

Then, the PCRF 600 transfers a PCC response message including the NBIFOM function indication thereof and the indication PDN 1 (WLAN offloadability=No) indicating that the PDN connection identified by the PDN 1 is not offloaded to the WLAN to the P-GW 530.

Then, the P-GW 530 transfers the NBIFOM function indication and the indication PDN 1 (WLAN offloadability=No) indicating that the PDN connection identified by the PDN 1 is not offloaded to the WLAN to the MME 510 and the S-GW 520. Subsequently, the MME 510 transmits a message including the NBIFOM function indication to the UE 100.

Therefore, the P-GW 530 may not request the UE to add/update the routing rule to move the IP flow for the corresponding PDN to the WLAN by triggering the PCRF, and the like.

Figure 14:
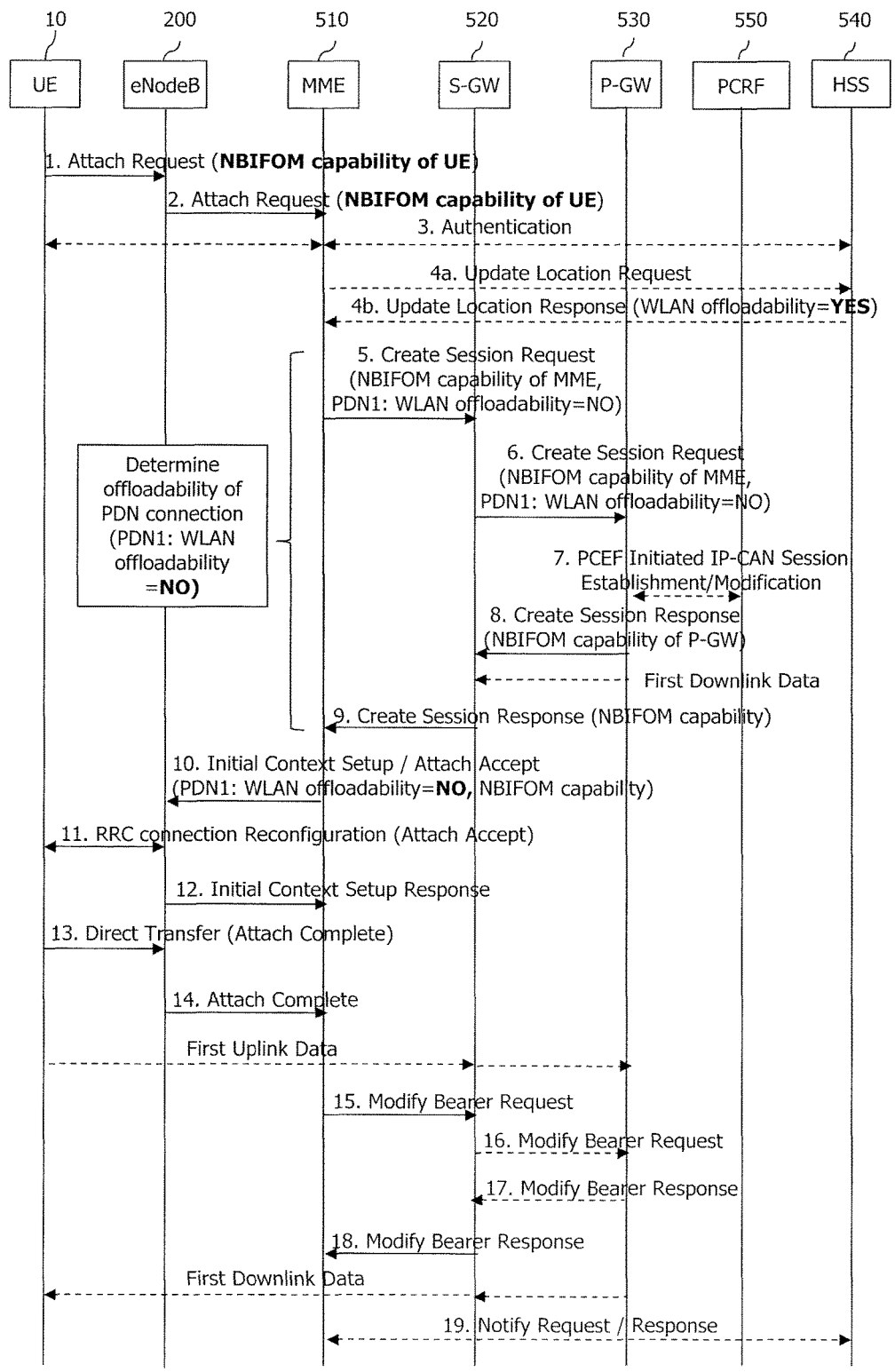
FIG. 14 is a signal flowchart illustrating another solution scheme according to one disclosure of the present specification.

FIG. 14 is a signal flowchart illustrating another solution scheme according to one disclosure of the present specification.

Referring to FIG. 14, the MME 510 determines whether the PDN connection is offloaded based on the WLAN offloadability indication during an attach process. In FIG. 14, it is exemplarily illustrated that the MME 510 determines that the PDN connection identified by the PDN 1 is not offloaded to the WLAN. Then, the MME 510 transfers the session generation request message including the indication PDN 1 (WLAN offloadability=No) indicating that the PDN connection identified by the PDN 1 is not offloaded to the WLAN to the S-GW 520 and the P-GW 530. Further, the MME 510 may transfer an attach accept message including the indication PDN 1 (WLAN offloadability=No) indicating that the PDN connection identified by the PDN 1 is not offloaded to the WLAN to the UE 100.

1 and 2) In detail, the UE 100 transmits an attach request message including the NBIFOM function indication thereof to the MME 510 through eNodeB 200.

3) Subsequently, an authentication procedure is performed.

4) Meanwhile, the MME 510 transmits a location update request message to the HSS 540 and the HSS 540 transmits a location update response message. In this case, an indication (WLAN offloadability=Yes) indicating the WLAN offloadability is included in the location update message.

5) Meanwhile, the MME 510 determines whether the PDN connection is offloaded. In this case, according to the WLAN offloadability indication (WLAN offloadability=Yes) acquired from the HSS, even though it is possible to offload the PDN connection the WLAN, the MME 510 may determine that the PDN connection identified by the PDN 1 is not offloaded to the WLAN. Then, the MME 510 transfers the session generation request message including the indication PDN 1 (WLAN offloadability=No) indicating that the PDN connection identified by the PDN 1 is not offloaded to the WLAN to the S-GW 520 together with the NBIFOM function indication thereof.

6) The S-GW 520 transfers the session generation request message to the P-GW 530.

7) The session establishing/modifying procedure is performed between the P-GW 530 and the PCRF 600.

8) The P-GW 530 transfers the session generation response message including the NBIFOM function indication to the S-GW 520.

9) The S-GW 520 transfers the session generation response message including the NBIFOM function indications of the S-GW 520 and the P-GW to the MME 510.

10 and 11) The MME 510 transfers the attach accept message including the indication PDN 1 (WLAN offloadability=No) indicating that the PDN connection identified by the PDN 1 is not offloaded to the WLAN to the UE 100 through the eNodeB 200 together with the NBIFOM function indication.

<Disclosure Organization of Present Specification>

In order to maintain consistency between the WLAN offloadability indications for the PDN connection, when the MME provides the WLAN offloadability indication for the PDN connection to the UE, the MME may provide the WLAN offloadability indication even to the P-GW/PCRF. The indication may be provided together with the NBIFOM function indication during the PDN connection establishing/modifying procedure.

When the P-GW/PCRF receives the indication (for example, an indication indicating that the WLAN offloading is not permitted with respect to a specific PDN connection), the P-GW may perform the following operations.

The P-GW may not request the routing rule for moving the IP flow to the WLAN.

Alternatively, the P-GW may not confirm the IP flow mobility of the corresponding PDN during the NBIFOM function negotiation procedure.

Meanwhile, when the UE performs an initial PDN connection establishing procedure, the UE may operate as follows.

The UE 100 may transmit a PDN connection request message including the NBIFOM function indication.

The MME 510 and the S-GW 520 may provide the NBIFOM function indications thereof to the P-GW. The MME 510 may provide an indication indicating whether the traffic of the PDN connection may be offloaded to the WLAN to the P-GW 530.

During the IP-CAN session establishing procedure, the P-GW 530 may transfer the NBIFOM function indications of the UE and the P-GW and the RAT type of the P-GW 530 to the PCRF. The P-GW 530 may provide the indication indicating whether the traffic of the PDN connection may be offloaded to the WLAN to the PCRF 600. The PCRF 600 may provide the NBIFOM function indication to the P-GW 530.

When the PCRF 600, the S-GW 520, and the P-GW 530 support the NBIFOM function, the P-GW 530 may transfer the indication therefor to the UE. The P-GW 530 may provide the indication indicating whether the traffic of the PDN connection may be offloaded to the WLAN during an NBIFOM function support negotiation procedure.

When the UE 100 performs the initial PDN connection establishing procedure, the UE 100 may operate as follows.

The UE 100 may transmit an activate PDP context request message including the NBIFOM function indication.

The S-GW 520 or an SGSN may notify whether the NBIFOM function of the S-GW 520 or SGSN is supported to the P-GW 530.

During the IP-CAN session establishing procedure, the P-GW 530 may transfer the NBIFOM function indications and the RAT types to the PCRF. The P-GW 530 may provide the indication indicating whether the traffic of the PDN connection may be offloaded to the WLAN to the PCRF 600. The PCRF 600 may provide the NBIFOM function indication thereof to the P-GW 530.

When the PCRF 600, the S-GW 520, and the P-GW 530 support the NBIFOM function, the P-GW 530 may transfer the indication therefor to the UE. The P-GW 530 may provide the indication indicating whether the traffic of the PDN connection may be offloaded to the WLAN during the NBIFOM function support negotiation procedure.

Contents described up to now may be implemented by hardware. They will be described with reference to FIG. 15.

Figure 15:
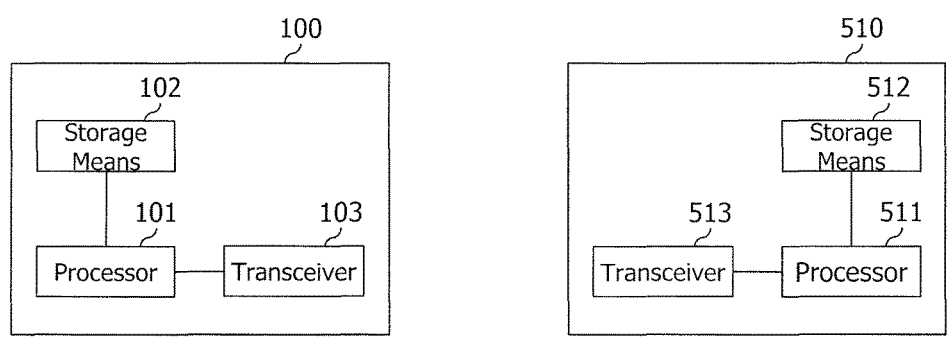
FIG. 15 is a configuration block diagram of a UE 100 and an MME 510 according to an embodiment of the present invention.

FIG. 15 is a configuration block diagram of a UE 100 and an MME 510 according to an embodiment of the present invention.

As illustrated in FIG. 15, the UE 100 includes a storage means 101, a controller 102, and a transceiver 103. In addition, the MME 510 includes a storage means 511, a controller 512, and a transceiver 513.

The storage means 105 and 511 stores the aforementioned method.

The controllers 102 and 512 control the storage means 101 and 511 and the transceivers 103 and 513. The controllers 102 and 512 control the storage means 101 and 511 and the transceivers 103 and 513. In addition, the controllers 102 and 512 transmit the aforementioned signals through the transceivers 103 and 513.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for determining whether to offload traffic of a user equipment (UE) to a wireless local area network (WLAN), the method performed by a network entity in charge of a control plane and comprising:

receiving subscriber information on the UE from a subscriber information server, wherein the subscriber information includes a first WLAN offloadability information for a packet data network (PDN) connection;

determining WLAN offloadability for the PDN connection based on the first WLAN offloadability information and configuration information;

transmitting network based Internet Protocol (IP) flow mobility (NBIFOM) function information of the network entity and a second WLAN offloadability information for the PDN connection which includes the determined WLAN offloadability to network nodes, which include a serving gateway (S-GW) and a PDN gateway (P-GW); and transmitting the second WLAN offloadability information to the UE, wherein when the determined WLAN offloadability is that the PDN is disabled to be offloaded to the WLAN, the second WLAN offloadability information is used as a highest priority condition among a plurality of conditions which are used by the P-GW for determining whether to perform the NBIFOM for allowing the PDN to be offloaded to the WLAN.

2. The method of claim 1, wherein the transmitting of the second WLAN offloadability information to the network nodes includes transmitting a session generation request message including the second WLAN offloadability information to the P-GW through the S-GW.

3. The method of claim 2, wherein the session generation request message further includes the NBIFOM function information of the network entity.

4. A method for supporting network based Internet Protocol (IP) flow mobility (NBIFOM) in a mobile communication network, the method performed by a gateway and comprising:
    receiving NBIFOM function information of a user equipment (UE) and network nodes and a wireless local area network (WLAN) offloadability information for a packet data network (PDN);
    determining whether to perform NBIFOM for allowing the PDN to be offloaded to the WLAN by performing the NBIFOM based on the function of the NBIFOM of the gateway, the received NBIFOM function information of the network nodes and the UE, and the received WLAN offloadability information; and
    transmitting a result that the NBIFOM is disabled to the UE and the network nodes when it is determined that the PDN is disabled to be offloaded to the WLAN based on the received WLAN offloadability information even though the NBIFOM is enabled to be performed based on the received NBIFOM function information of the network nodes and the UE.

5. The method of claim 4, wherein the network nodes include a serving gateway (S-GW) and a mobility management entity (MME).

6. A network entity for determining whether to offload traffic of a user equipment (UE) to a wireless local area network (WLAN), the network entity comprising:
    a transceiver; and
    a processor operatively connected to the transceiver, wherein the processor is configured to:
        control the transceiver to receive subscriber information on the UE from a subscriber information server, wherein the subscriber information includes a first WLAN offloadability information for a packet data network (PDN) connection,
        determine WLAN offloadability for the PDN based on the first WLAN offloadability indication and configuration information,
        control the transceiver to transmit network based Internet Protocol (IP) flow mobility (NBIFOM) function information of the network entity and a second WLAN offloadability information for the PDN connection which includes the determined WLAN offloadability to network nodes, which include a serving gateway (S-GW) and a PDN gateway (P-GW), and
        control the transceiver to transmit the second WLAN offloadability information to the UE,
        wherein when the determined WLAN offloadability is that the PDN is disabled to be offloaded to the WLAN, the second WLAN offloadability information is used as a highest priority condition among a plurality of conditions which are used by the P-GW for determining whether to perform the NBIFOM for allowing the PDN to be offloaded to the WLAN.

7. The network entity of claim 6, wherein the processor controls the transceiver to transmit a session generation request message including the second WLAN offloadability information to the P-GW through the S-GW.

8. The network entity of claim 7, wherein the session generation request message further includes the NBIFOM function information of the network entity.

* * * * *